(12) United States Patent
Johansson et al.

(10) Patent No.: US 10,547,370 B2
(45) Date of Patent: Jan. 28, 2020

(54) EFFICIENT CHANNEL CHARACTERISTICS HANDLING

(71) Applicant: Telefonaktiebolaget LM Ericsson (publ), Stockholm (SE)

(72) Inventors: Martin Johansson, Mölndal (SE); Henrik Asplund, Stockholm (SE); David Astely, Bromma (SE); Karl Werner, Segeltorp (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 134 days.

(21) Appl. No.: 15/560,569

(22) PCT Filed: Apr. 9, 2015

(86) PCT No.: PCT/EP2015/054229
§ 371 (c)(1),
(2) Date: Sep. 22, 2017

(87) PCT Pub. No.: WO2016/162043
PCT Pub. Date: Oct. 13, 2016

(65) Prior Publication Data
US 2018/0048374 A1    Feb. 15, 2018

(51) Int. Cl.
*H04B 7/06* (2006.01)
*H04L 25/02* (2006.01)
*H04W 84/04* (2009.01)

(52) U.S. Cl.
CPC ......... *H04B 7/0691* (2013.01); *H04L 25/021* (2013.01); *H04W 84/042* (2013.01)

(58) Field of Classification Search
CPC .............. H04B 7/0691; H04B 7/0663; H04B 7/0658–0663; H04B 7/0413; H04B 7/0619; H04L 25/03; H04W 84/042
See application file for complete search history.

(56) References Cited

U.S. PATENT DOCUMENTS

2010/0238984 A1*  9/2010  Sayana ............... H04B 7/0634
                                                              375/219
2011/0080971 A1*  4/2011  Clerckx ............. H04B 7/0626
                                                              375/267

(Continued)

FOREIGN PATENT DOCUMENTS

EP           1890499 A1     2/2008
WO       2010147346 A2    12/2010

OTHER PUBLICATIONS

International Search Report and Written Opinion dated Nov. 19, 2015 for International Application Serial No. PCT/EP20151054229, International Filing Date: Apr. 9, 2015 consisting of 11-pages.

(Continued)

*Primary Examiner* — Maharishi V Khirodhar
*Assistant Examiner* — Kenneth P Hunt
(74) *Attorney, Agent, or Firm* — Christopher & Weisberg, P.A.

(57) ABSTRACT

A method, performed in a network node, for channel characteristics handling for an antenna array in a communication system. The antenna array has a plurality of antenna elements. The method includes obtaining geometrical relationships between any pair of antenna elements in a spatial layout of the antenna array. All pairs of antenna elements are classified into sets based on the obtained geometrical relationships, wherein all pairs of antenna elements in a set have substantially equal geometrical relationship in the spatial layout. The method includes determining a representation of channel characteristics as $P(\beta)$, wherein argument $\beta$ is a vector of elements, each element relating to a magnitude and/or phase of covariance between the antenna elements in the set, and P is a mapping function based on the classifying. Antenna characteristics are processed based on the representation $P(\beta)$.

23 Claims, 15 Drawing Sheets

(56) References Cited

U.S. PATENT DOCUMENTS

| | | | | |
|---|---|---|---|---|
| 2011/0150052 A1* | 6/2011 | Erell | ...................... | H04B 7/063 |
| | | | | 375/219 |
| 2011/0310951 A1* | 12/2011 | Cvijetic | ............... | H04B 10/548 |
| | | | | 375/233 |
| 2012/0069887 A1* | 3/2012 | Park | ..................... | H04B 7/0417 |
| | | | | 375/224 |
| 2016/0165457 A1* | 6/2016 | Inoue | ................... | H04W 16/28 |
| | | | | 455/562.1 |

OTHER PUBLICATIONS

3GPP TSG-RAN WG1 #60bis, R1-101790, Title: "Covariance Compression for Codebook Adaptation," Source: Marvell, Agenda Item: 6. 3. 4. 2, Document for: Discussion, Location and Date: Beijing, Apr. 12-16, 2010, consisting of 6-pages.

* cited by examiner (a)

EFFICIENT CHANNEL CHARACTERISTICS HANDLING

CROSS-REFERENCE TO RELATED APPLICATIONS

This application is a Submission Under 35 U.S.C. § 371 for U.S. National Stage Patent Application of International Application Number: PCT/EP2015/054229, filed Apr. 9, 2015 entitled "EFFICIENT CHANNEL CHARACTERISTICS HANDLING," the entirety of which is incorporated herein by reference.

TECHNICAL FIELD

The present disclosure relates to methods and arrangements for improved channel characteristics handling, in particular methods and arrangements for handling channel characteristics for large antenna arrays.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. LTE brings significant improvements in capacity and performance over previous radio access technologies. However, while operators' have been successful in providing mobile broadband using LTE deployments, user experience in terms of latency and data rates is a differentiating factor between different operators' networks. The ever increasing end-user demands are a significant challenge to the operators.

The modernization of antenna technologies in practice is moving forward in a high pace, which enables the use of more advanced antenna setups and techniques. Large antenna arrays have been used in radar applications, satellite communications, and point-to-point communications. The possible use of large antenna arrays for wireless cellular communications is also being considered in order to increase capacity and performance in a mobile radio network. The use of multiple antennas combined with adequate processing is one way to improve the spectral efficiency of a communication system.

When using multiple antennas, e.g., in the form of large antenna arrays at base stations in a mobile radio network, transmissions between nodes of the radio network, such as between said base stations and wireless devices, pass over several antenna elements. Therefore, a radio channel between, e.g., a wireless device and a serving base station having a plurality of antenna elements is multi-dimensional in that there is a plurality of propagation paths between the wireless device and the different antenna elements of the serving base station, where each path is associated with a gain and a phase, relative to the other paths or to a reference value. It is important for many reasons to be able to characterize this multi-dimensional channel.

A traditional way of characterizing this type of multi-dimensional channel is by a so-called covariance matrix of the channel, which provides information on a stochastic relationship between signals passing over the different antenna elements. This covariance matrix is often signalled between nodes of the network and also used in signal processing in the communication system, e.g., in beamforming applications.

However, the size of the above-mentioned covariance matrix grows with the square of the number of elements in the antenna array. Large antenna array sizes may hence tax resources concerning computational power and memory storage, even for simple sample covariance estimators. Furthermore, in cases where the channel state information, CSI, that is passed e.g. between nodes in a communication network includes covariance matrix information, the transmission bandwidth of the inter-node link may be overloaded. While this may be manageable for a single link or for moderately-sized arrays, the size of the matrix in combination with a large number of concurrent communication links may become unmanageable.

There is thus a need in the art for improved handling of channel characteristics.

SUMMARY

An object of the present disclosure is to provide methods and arrangements for improved handling of channel characteristics for an antenna array in a communication system, the antenna array having a plurality of antenna elements.

This object is achieved by a method, performed in a network node, for channel characteristics handling for an antenna array in a communication system, the antenna array having a plurality of antenna elements. The method comprises obtaining geometrical relationships between any pair of antenna elements in a spatial layout of the antenna array. The method further comprises a step of classifying all pairs of antenna elements into sets based on the obtained geometrical relationships, wherein all pairs of antenna elements in a set have substantially equal geometrical relationship in the spatial layout. The method also comprises determining a representation of channel characteristics as $P(\beta)$, wherein argument $\beta$ is a vector of elements, each element relating to a magnitude and/or phase of covariance between the antenna elements in the set, and P is a mapping function based on the step of classifying. The method further comprises processing antenna characteristics based on the representation $P(\beta)$.

An advantage of this solution is that estimation of channel characteristics in the form of channel covariance can be performed with similar quality, but lower complexity than prior art methods. Another advantage is that Channel State Information, CSI, reporting, and storage of CSI reports, can be made more efficient. A further advantage is that the traffic load of inter-node links is reduced. A yet further advantage is that memory requirements are reduced when it comes to storing channel characteristics. Another advantage is that signal processing operations relating to channel characteristics can be made more efficient in terms of implementation.

According to an aspect of the disclosure, the step of processing antenna characteristics comprises performing a measurement on at least one signal and estimating elements of $\beta$ based on the measurement.

By estimating elements of $\beta$ based on the measurement, the quality of the channel characteristics estimation is improved. An estimation of a channel covariance will, for a given number of data points and a given signal to noise ratio, SNR, be of better quality the fewer unique parameters need to be estimated. This is ensured by the choice of representation $P(\beta)$.

According to an aspect of the disclosure, the step of performing a measurement on at least one signal is based on a processing of at least one signal representing respective at least one pair of a set obtained in the classifying.

An advantage of this is that the determination of β can be optimised with respect to system performance, size of the classified sets or properties of the geometrical relationships of the classified sets.

According to an aspect of the invention, the step of processing antenna characteristics comprises transmitting information relating to β.

According to an aspect, the step of transmitting information relating to β comprises transmitting β between at least two network nodes.

According to an aspect, the step of transmitting information relating to β comprises transmitting β to a memory.

The performance and device demands of operations involving transmitting information relating to channel characteristics, such as a covariance matrix, can be improved by transmitting information relating to β instead of transmitting, e.g., a covariance matrix as a regular list of columns or rows of the matrix.

According to an aspect, the step of processing antenna characteristics comprises performing a signal processing operation involving the covariance between antenna elements, the signal processing operation being expressed as a function of the elements of β.

Expressing the signal processing operation as a function of the elements of β reduces the complexity of the signal processing operation.

According to an aspect, the step of performing a signal processing operation involving the covariance between antenna elements comprises determining at least one weight vector w based on the elements of β, the weight vector w consisting of antenna weights being used to adjust magnitude and phase of signals to and from antenna elements of the antenna array.

Consequently, beamforming is made more efficient. According to an aspect, the step of processing antenna characteristics comprises transmitting information relating to P, the information relating to P enabling estimation of β based on a measured signal.

According to an aspect, the information relating to P comprises the representation P(β).

According to an aspect, the information relating to P comprises an indication relating to a representation P(β) stored at a receiving node.

This has the advantage of sharing the representation between nodes.

According to an aspect, the step of determining a representation comprises an error tolerance, such that $$P(\beta) \approx R$$

within the error tolerance, wherein ≈ denotes approximately equal to, and covariance between antenna elements is represented by a covariance matrix R.

The use of an error tolerance enables taking into account variations of the spatial layout of the antenna array, in particular when obtaining geometrical relationships and classifying pairs of antenna elements.

According to an aspect, P is a matrix defined by $$\text{vec}\{R_{mn}\} = P\beta$$

wherein covariance between antenna elements is represented a covariance matrix $R_{mn}$, $\text{vec}\{R_{mn}\}$ denoting the vectorization of $R_{mn}$, m and n being the number of antenna elements of the antenna array.

This representation enables a complexity reduction of many operations involving a covariance matrix.

According to an aspect, the elements of β are real-valued.

This simplifies the implementation of the representation P(β). By β having only real-valued elements, more information of the representation P(β) is related to P. Since β is the part of the representation that is typically transferred most frequently between network nodes, the network load is reduced. Furthermore, the elements of β are used in many signal processing operations. The elements of β being real-valued enable a complexity reduction of many of those signal processing operations.

The present disclosure also relates to a network node and a computer program that implement the disclosed method, with the advantages described above.

BRIEF DESCRIPTION OF THE DRAWINGS

FIG. 13 illustrates modules of a terminal for handling channel characteristics for an antenna array in a communication system, according to an aspect of the disclosure.

DETAILED DESCRIPTION

Figure 1:
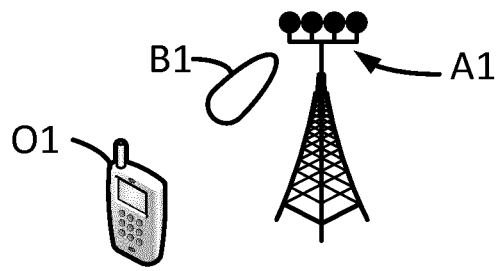
FIG. 1a illustrates an aspect of the disclosed method for a base station in a beamforming application.
FIG. 1b illustrates an aspect of the disclosed method for a radar system in a beamforming application.
Figure 1:
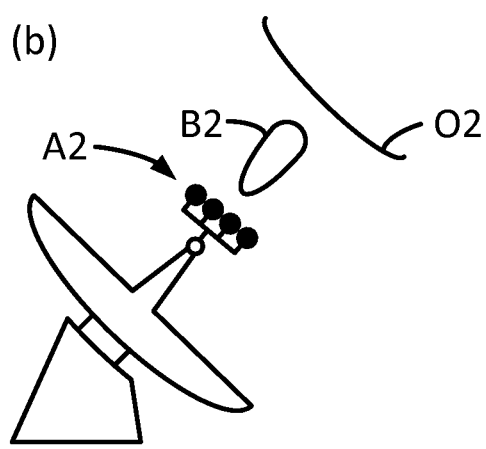

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

FIG. 1a illustrates an aspect of the disclosed method for a base station in a beamforming application. The base station comprises an antenna array A1, wherein the antenna array A1 comprises a plurality of antenna elements. The base station uses a representation P(β) of channel characteristics according to an aspect of the present disclosure. The base station transmits information relating to P to a wireless device O1, so that the wireless device O1 can perform measurements on the signals received in downlink and estimating β based on the measurements. β is then transmitted from the wireless device O1 to the base station in uplink. The base station uses β in a signal processing operation, wherein the effects on signal gain relating to a set of weight vectors are evaluated based on β. The weight vector predicting the best signal gain is used to process the antenna characteristics B1 by means of beamforming.

A communication link is associated with a certain capacity in terms of, e.g. bits/sec. By the proposed technique of representing channel characteristics more efficiently, less of this capacity is taken up by transmissions of channel characteristics, leaving more room for payload transmissions, i.e. user data. The signal processing operations using the representation according to this aspect are reduced in complexity, leading to faster processing times and reduced load on memory and bandwidth.

FIG. 1b illustrates an aspect of the disclosed method for a radar system in a beamforming application. The radar system comprises an antenna array A2, wherein the antenna array A2 comprises a plurality of antenna elements. The radar transmits signals that are reflected on an object O2 and the reflected signals are received by the antenna array A2, wherein antenna characteristics is handled according to an aspect of the present disclosure, the aspect comprising a representation P(β) of channel characteristics, wherein argument β is a vector of elements and P is a mapping function. The radar performs a measurement on the received signals and uses the measurement to determine elements of the vector argument β. According to an aspect, the effects on signal gain of a plurality of weight vectors w, wherein each weight vector consisting of antenna weights being used to adjust magnitude and/or phase of signals to and from antenna elements of the antenna array, are determined. According to a further aspect, the signal gain is a function of the elements of β and the weight vectors. The weight vector predicting the best signal gain is used to process the antenna characteristics B2 by means of beamforming.

Figure 2:
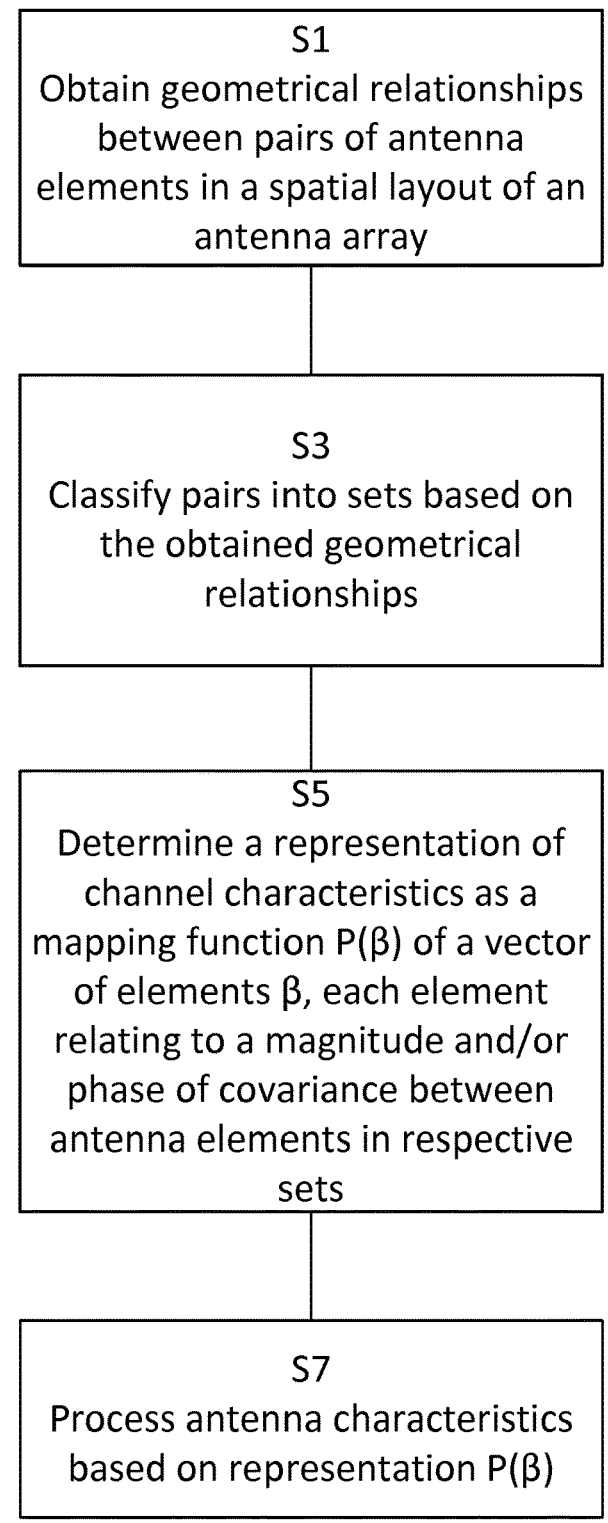
FIG. 2 shows a flowchart illustrating method steps performed in a network node.

FIG. 2 shows a flowchart illustrating method steps for channel characteristics handling for an antenna array in a communication system, wherein the antenna array has a plurality of antenna elements and the method is performed in a network node.

The method comprises obtaining S1 geometrical relationships between any pair of antenna elements in a spatial layout of the antenna array. According to an aspect, the geometrical relationship between each antenna pair is represented by a vector indicating the relative position of one antenna element in a pair with respect to the other antenna element of the same pair.

Figure 7:
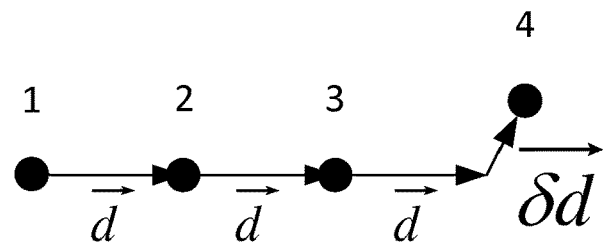
FIG. 7 illustrates an aspect of error tolerance when determining a representation.
Figure 7:
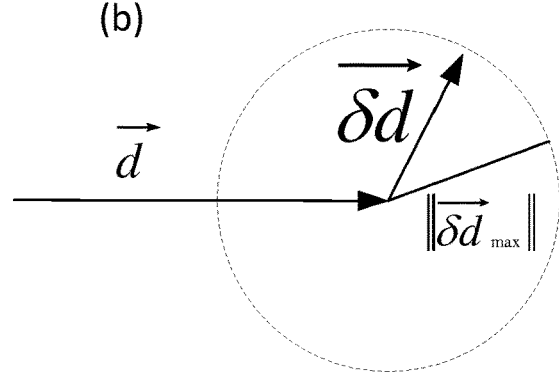

The method further comprises classifying S3 all pairs of antenna elements into sets based on the obtained geometrical relationships, wherein all pairs of antenna elements in a set have substantially equal, or equal, geometrical relationship in the spatial layout. According to an aspect, all pairs of antenna elements having the same relative position with respect to each other in the spatial layout of the antenna array, up to a sign or direction of the position indicator, are classified to belong to the same set. The term "substantially" is to be understood as that we do not require the geometrical relationships to be exactly equal, but close enough. According to an aspect, substantially equal depends on a measure relating to signal wavelength. A further aspect illustrating substantially equal is illustrated in FIG. 7.

The method also comprises determining S5 a representation of channel characteristics as P(β), wherein argument β is a vector of elements, each element relating to a magnitude and/or phase of covariance between the antenna elements in the set, and P is a mapping function based on the classifying S3 According to an aspect, the representation P(β) approximates a covariance matrix R as vec{R}=Pβ, wherein vec{R} denotes vectorization of R, P is a matrix and the elements of β are real valued.

The method additionally comprises processing S7 antenna characteristics based on said representation P(β). According to one aspect of the disclosure, β is transferred between network nodes in relation to conveying Channel State Information. According to a further aspect of the disclosure, a signal processing operation is performed, wherein the signal processing operation is a function of elements of β. In a yet further aspect of the disclosure, the signal processing operation is part of a beamforming operation.

Figure 11:
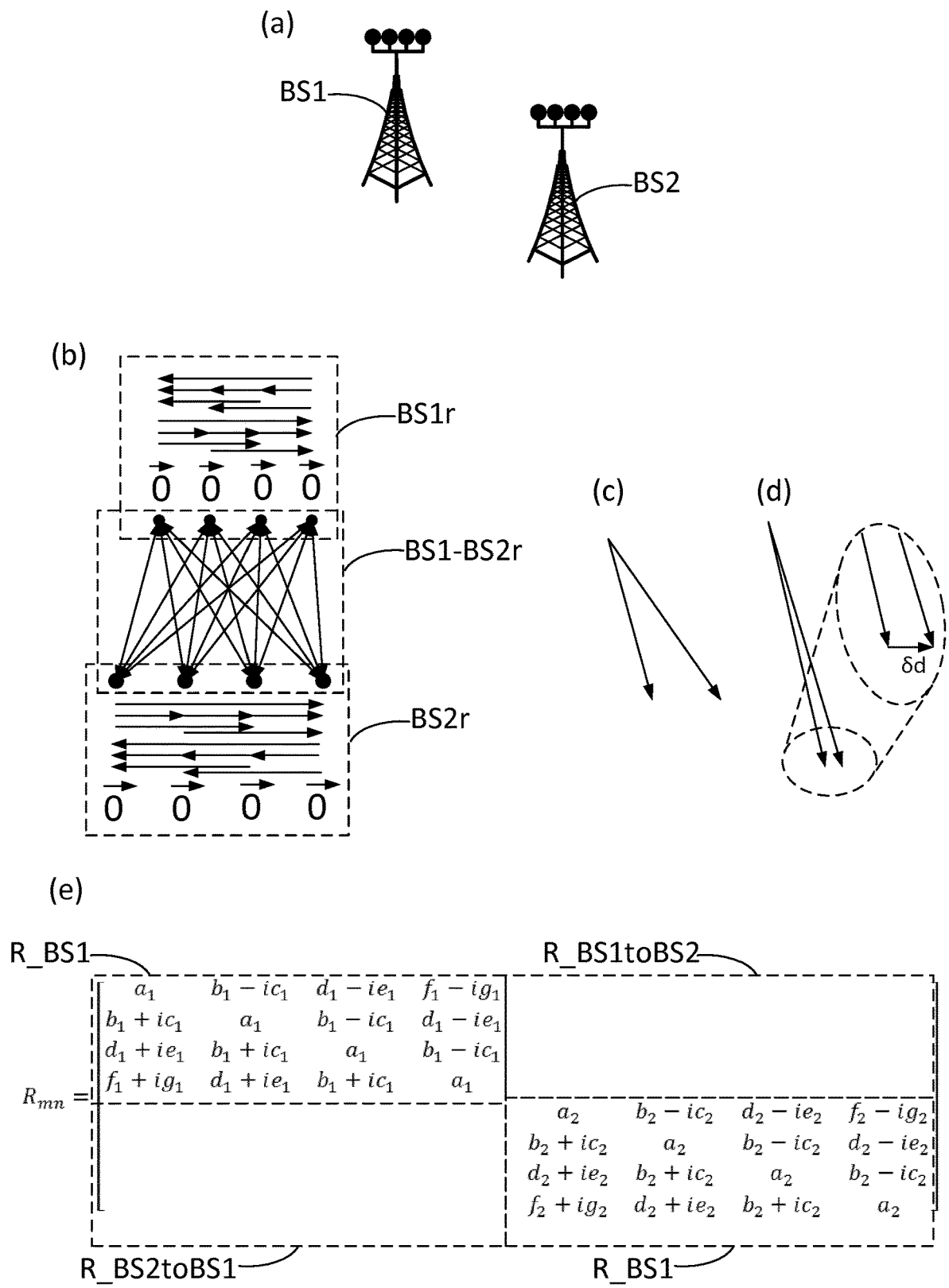
FIG. 11 illustrates an aspect of the method for two base stations.

Embodiments of the disclosed method are not limited only to single network nodes, but may be implemented for handling channel characteristics for a plurality of nodes. Aspects comprising two base stations, each base station comprising an antenna array with a plurality of antenna elements, are illustrated in FIG. 11 below. Embodiments of the disclosed method may also handle channel characteristics for wireless devices and base stations, wherein both a wireless device and a base station each comprises an antenna array, wherein each antenna array comprises a plurality of antenna elements. According to an aspect of the disclosed method, channel characteristics between a wireless device and a base station, each comprising an antenna element having a plurality of antenna elements, is handled, wherein handling the channel characteristics comprises determining S5 a representation P(β) of a 3D-covariance matrix. According to another aspect of the disclosed method, handling channel characteristics comprises handling lists of covariance matrices, one for each transmission antenna element.

Figure 3:
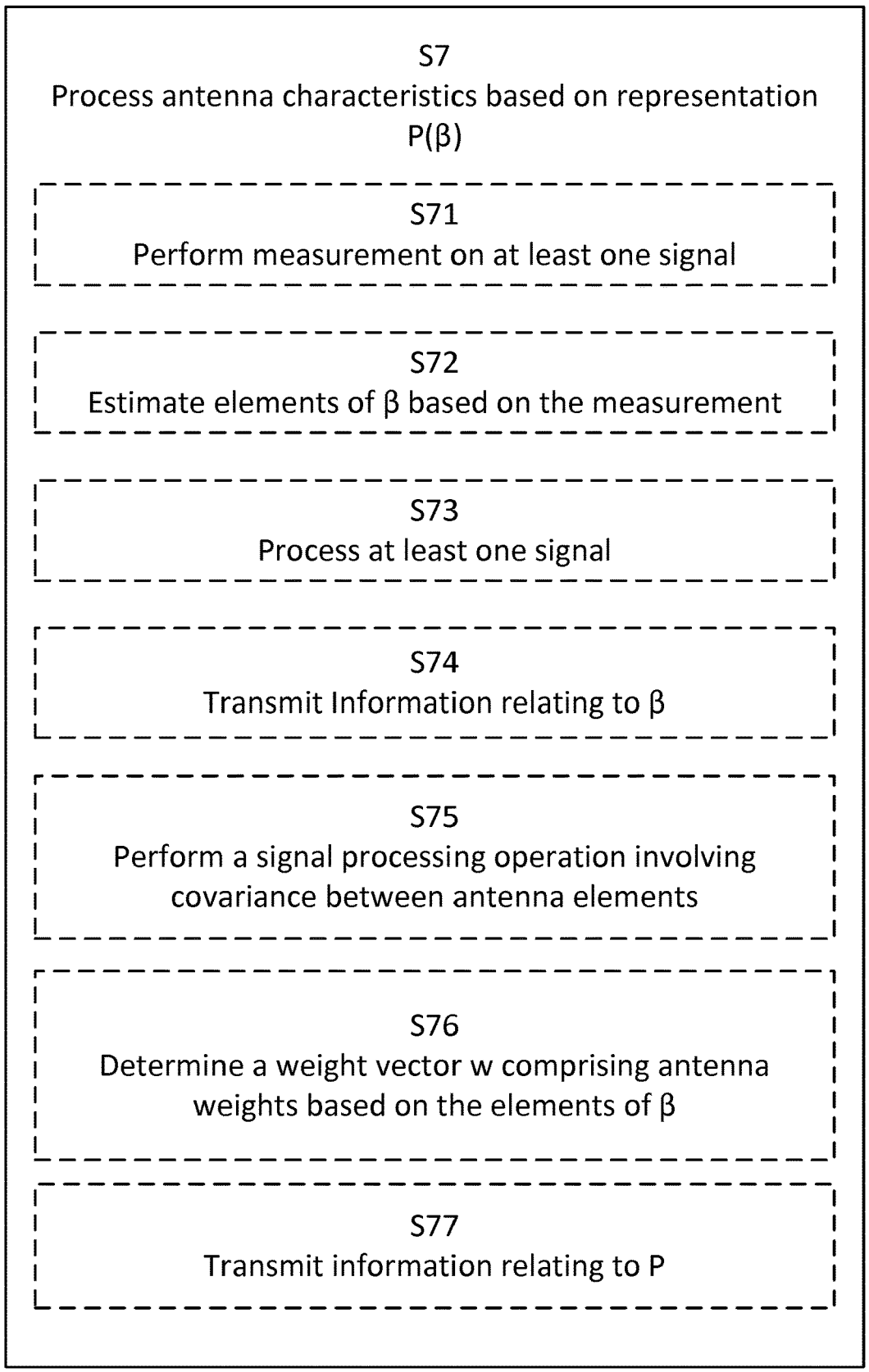
FIG. 3 shows a block diagram illustrating optional features in processing antenna characteristics.

FIG. 3 shows a block diagram illustrating optional features in processing S7 antenna characteristics. According to one aspect of the disclosure, processing S7 antenna characteristics comprises performing S71 a measurement on at least one signal and estimating S72 elements of β based on the measurement. Aspects of performing S71 a measurement on at least one signal and estimating S72 elements of β based on the measurement are illustrated further in relation to FIG. 6.

According to an aspect of the disclosure, the step of performing S71 a measurement on at least one signal is based on a processing S73 of at least one signal representing respective at least one pair of a set obtained in the classifying S3 The sets of antenna pairs obtained in the classifying S3 typically comprise a plurality of geometries. Each antenna pair of such a set is represented by a signal. According to some aspects, as will be described in more detail below, the antenna pairs of a set obtained in the classifying S3 are represented by a representative pair of antenna elements.

According to a further aspect of the disclosure, the step of performing S71 a measurement on at least one of the received signals is based on a signal representing a set obtained in the classifying S3. Here, the representative pair is selected to be one of the antenna pairs of the set obtained in the classifying S3 and the signal representing the set relates to a signal representing the selected antenna pair. In terms of complexity, this is one of the simplest ways of estimating β, since only signals relating to one antenna pair of a respective set obtained in the classifying S3 is used.

According to another aspect of the disclosure, the step of performing S71 a measurement on at least one of the received signals is based on a processing S73 of a plurality of signals representing respective plurality of pairs of a set obtained in the classifying S3. For this aspect, the representative antenna pair of a set obtained in the classifying is based on a plurality of the antenna pairs of the set. This enables embodiments where one optimizes the estimation of β with respect to complexity, i.e. how many of the antenna pairs within a set obtained in the classifying that is used as a basis for determining the representative antenna pair of the set, and thus the signal relating to the representative antenna pair which is used to estimate β.

According to an aspect, the processing of a plurality of signals comprises an averaging of the plurality of signals. According to a further aspect, the processing of a plurality of signals comprises a weighted averaging of the plurality of signals. This enables embodiments where one optimizes the estimation of β with respect to quality.

According to an aspect of the disclosure, processing S7 antenna characteristics comprises transmitting S74 information relating to β. According to an aspect of the disclosure, processing S7 antenna characteristics comprises transmitting S74 information relating to β between at least two network nodes. According to an aspect of the disclosure, processing S7 antenna characteristics comprises transmitting S74 information relating to β to a memory.

According to an aspect of the disclosure, processing S7 antenna characteristics comprises performing S75 a signal processing operation involving covariance between antenna elements, wherein the signal processing operation is expressed as a function of the elements of β. According to an aspect of the disclosure, performing S75 a signal processing operation involving the covariance between antenna elements comprises determining S76 at least one weight vector w based on the elements of β, the weight vector w consisting of antenna weights being used to adjust magnitude and/or phase of signals to and from antenna elements of the antenna array.

According to an aspect of the disclosure, processing S7 antenna characteristics comprises transmitting S77 information relating to P, the information relating to P enabling estimation of β based on a measured signal. According to a further aspect, the information relating to P comprises P. According to another aspect, the information relating to P comprises an indication relating to a representation P(β) stored at a receiving node.

Figure 4:
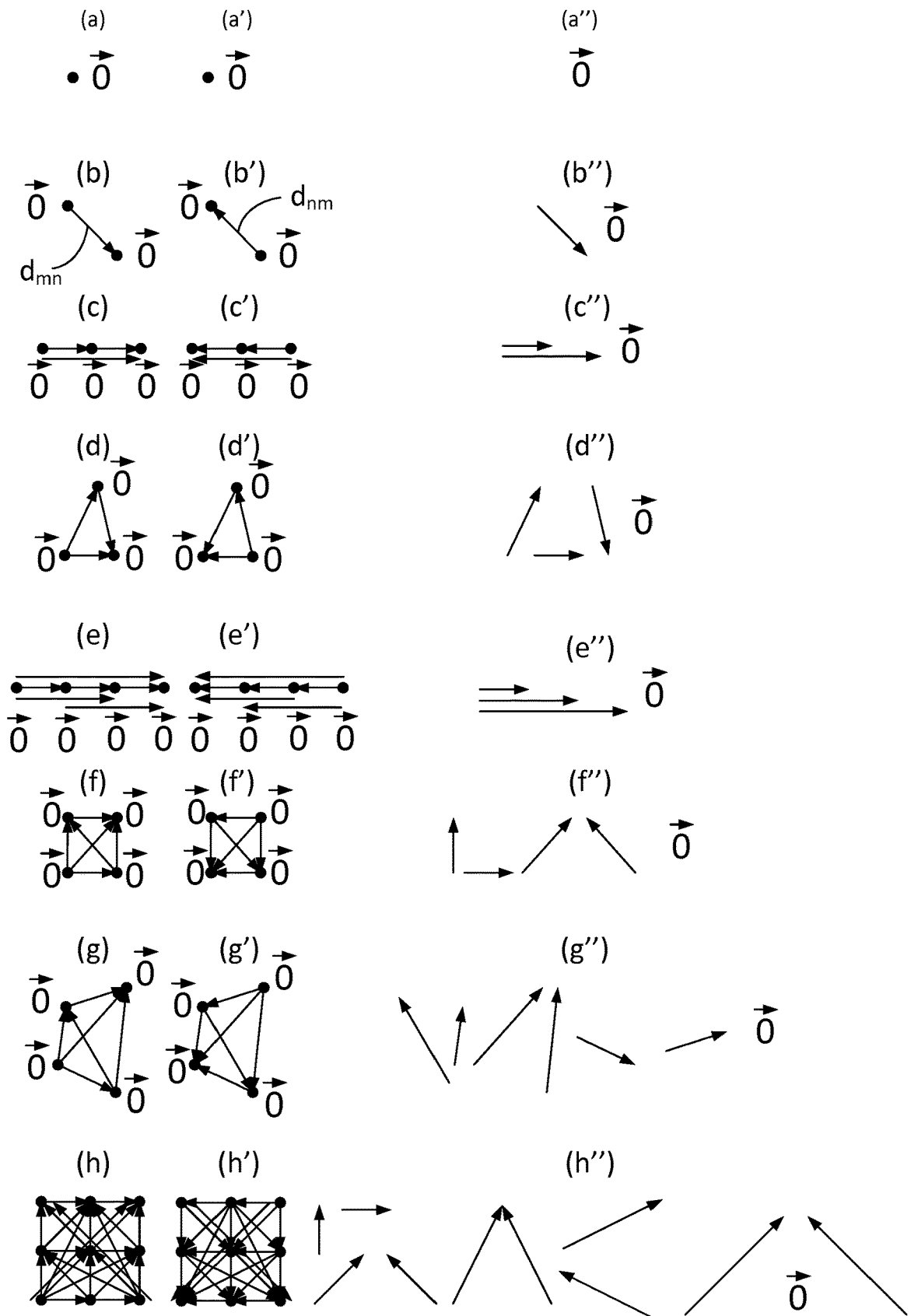
FIG. 4 illustrates antenna arrays and geometrical relationships between antenna elements of the antenna arrays.

FIG. 4 illustrates antenna arrays and geometrical relationships between antenna elements of the antenna arrays.

Each antenna array comprises a set of antenna elements, wherein the antenna elements are represented by black dots, and geometrical relationships between the antenna elements, wherein the geometrical relationships are represented by arrows. FIGS. 4a'-h' illustrate the respective antenna arrays of FIGS. 4a-h, and further geometrical relationships between the antenna elements, wherein the geometrical relationships are represented by arrows.

Specifically, FIGS. 4a-h and 4a'-h' illustrate
(a, a') an antenna array comprising one antenna element
(b, b') a uniform linear array comprising two antenna elements
(c, c') a uniform linear array comprising three antenna elements
(d, d') a non-uniform antenna array comprising three antenna elements
(e, e') a uniform linear array comprising four antenna elements
(f, f') a 2×2 uniform planar array
(g, g') a non-uniform antenna array comprising four antenna elements
(h, h') a 3×3 uniform planar array.

According to an aspect, the geometrical relationships are obtained S1 by, for each pair of antenna elements in the antenna array, relating the distance and direction of one antenna element of a pair to that of the other antenna element of the same pair. A pair of antenna elements is to be understood to also comprise so-called auto-pairs, meaning the geometrical relationship of a single antenna with itself.

According to an aspect, the respective positions of the antenna elements m and n of any pair of antenna elements in a spatial layout of the antenna array are described by position vectors $r_m$ and $r_n$, respectively. According to a further aspect, a geometrical relationship $d_{mn}$ between the antenna elements of the pair of antenna elements is defined by $r_m - r_n$, as illustrated in FIGS. 4b and 4b'. The geometrical relationship $d_{mn} = r_m - r_n$, describing how one antenna element is displaced with respect to another is hereinafter referred to as a displacement vector.

For an auto-pair, elements m and n refer to the same antenna element, $r_m$ and $r_n$ are identical and a displacement vector $d_{mn} = r_m - r_n$ is a null vector, denoted $\vec{0}$.

When elements m and n refer to different antenna elements, $r_m$ and $r_n$ are different, and displacement vectors $d_{mn}$ and $d_{nm}$ are vectors of the same magnitude, but with opposite directions.

FIGS. 4a-4h illustrate displacement vectors $d_{mn}$ for the respective antenna array and FIGS. 4a'-4h' illustrate displacement vectors $d_{nm}$, i.e. of the same magnitude, but with opposite directions compared to the vectors $d_{mn}$. The displacement vectors that are null vectors are not illustrated in FIGS. 4h and 4h' for clarity.

The method further comprises classifying S3 all pairs of antenna elements into sets based on the obtained geometrical relationships, wherein all pairs of antenna elements in a set have substantially equal geometrical relationship in the spatial layout.

If the antennas have substantially identical radiation patterns and the array is located in the far field of the sources or scatterers in the wireless channel, then the covariance or correlation $R_{mn}$ between any pair of antenna elements m, n will only depend on the displacement vector $d_{mn} = r_m - r_n$ between the two antenna elements, i.e. $R_{mn} = f(d_{mn})$, but not the individual position vectors $r_m$ and $r_n$ themselves, wherein $f(d_{mn})$ denotes a function of $d_{mn}$. Further, the correlation or covariance $R_{mn} = f(d_{mn}) = conj(f(-d_{mn})) = conj(R_{nm})$, i.e., changing the direction of the displacement vector results in a conjugate of the covariance coefficient.

According to an aspect, all pairs of antenna elements having the same relative position with respect to each other in the spatial layout of the antenna array, up to a sign or direction of the displacement vector, are classified to belong to the same set.

According to an aspect, pairs of antenna elements having geometrical relationships differing only by a sign are classified S3 to belong to the same set.

FIGS. 4a"-4h" illustrate displacement vectors that represent an element of a respective set, in which identical displacement vectors are classified S3 to be substantially equal, up to a sign or direction of the displacement vector.

Figure 5:
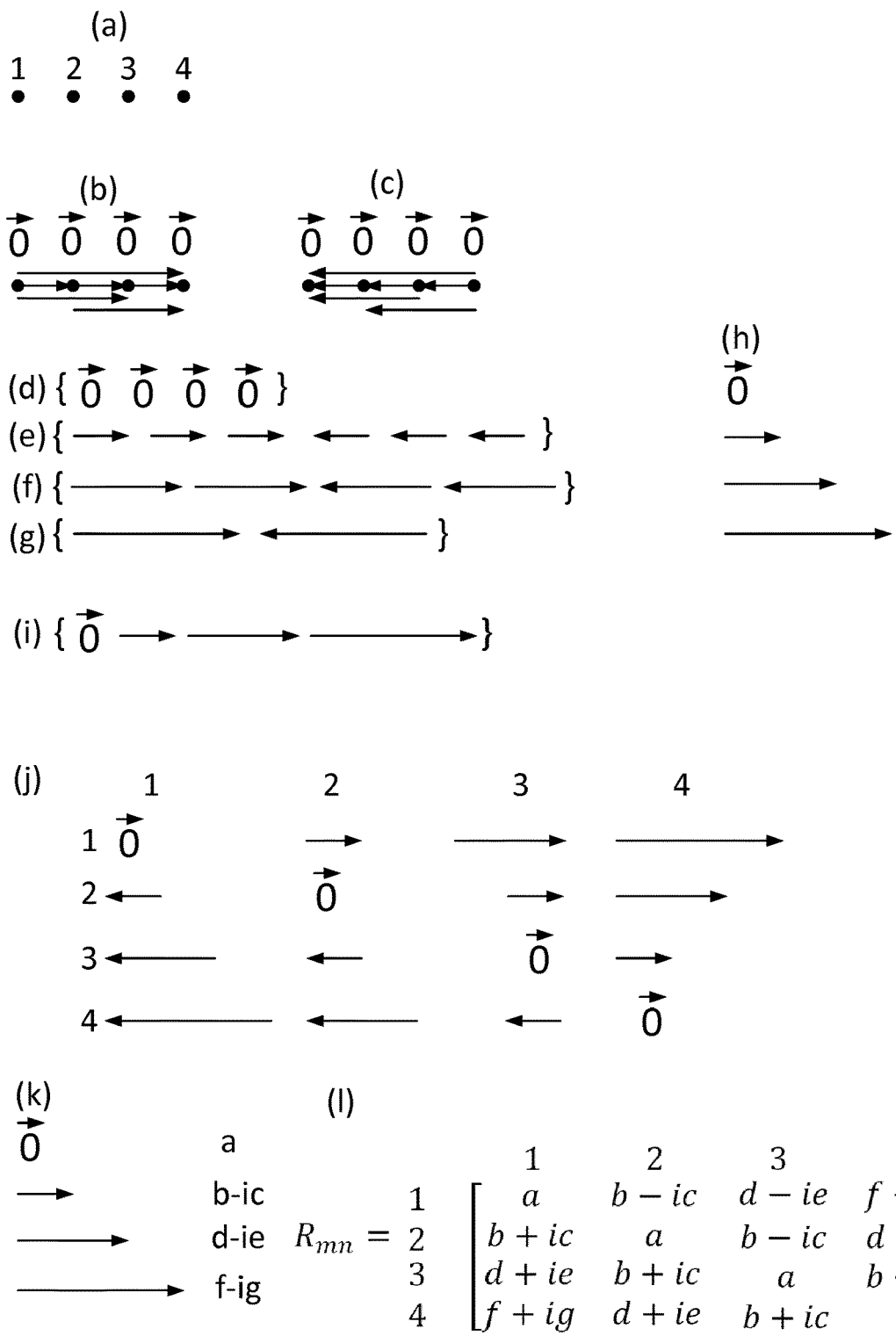
FIG. 5 illustrates an aspect of the method for a uniform linear array comprising four antenna elements.

FIG. 5 illustrates an aspect of the method for a uniform linear array comprising four antenna elements.

FIG. 5a illustrates a uniform linear array comprising four antenna elements, wherein the antenna elements are represented by black dots, labelled 1, 2, 3 and 4. According to an aspect, geometrical relationships between all pairs of antenna elements in a spatial layout of the antenna array are obtained S1. The geometrical relationships are obtained S1 using displacement vectors $d_{mn}=r_m-r_n$, where $r_m$ and $r_n$ are position vectors of the respective antenna element m, n of a pair of antennas, as is illustrated in FIGS. 5b and 5c.

According to a further aspect, all pairs of antenna elements are classified S3 into sets based on the obtained geometrical relationships, wherein all pairs of antenna elements in a set have substantially equal geometrical relationship in the spatial layout. Pairs of antenna elements in a set having substantially equal geometrical relationships is based on the displacement vectors, wherein two pairs are considered having substantially equal geometrical relationships if they are represented by substantially equal displacement vectors, up to a sign. As has been discussed in relation to FIG. 2 and, the term "substantially" is to be understood as that we do not require the geometrical relationships to be exactly equal, but only to within a norm or measure relating to a metric.

FIGS. 5d-g illustrate sets comprising subsets of the geometrical relationships of FIGS. 5b and c, wherein each set comprises geometrical relationships that have been classified S3 to have substantially equal geometrical relationship in the spatial layout, up to a sign.

The disclosed method comprises determining S5 a representation of channel characteristics as $P(\beta)$, wherein argument $\beta$ is a vector of elements, each element relating to a magnitude and/or phase of covariance between the antenna elements in the set, and P is a mapping function based on the classifying S3.

According to an aspect, representative geometrical relationships of the sets defined in the classifying S3 are used as a basis for representing channel covariance.

FIG. 5h illustrate representative geometrical relationships corresponding to a respective set of FIGS. 5d-5g. According to an aspect, each representative geometrical relationship is an element of a respective set of FIGS. 5d-5g.

FIG. 5i illustrates a set comprising the unique representative geometrical relationships of FIG. 5h. According to an aspect, the elements of the set of FIG. 5i are used as a basis for representing channel covariance.

A detailed aspect is described below in relation to FIG. 5j-5i for an antenna as illustrated in FIG. 5a, using the obtained S1 geometrical relationships, as illustrated in FIGS. 5b and 5c, and the classification S3 of the obtained S1 geometrical relationships, as illustrated in FIGS. 5d-5g.

According to an aspect, P is a matrix defined by $$\text{vec}\{R_{mn}\}=P\beta \qquad (1)$$

wherein covariance between antenna elements is represented by a covariance matrix $R_{mn}$, $\text{vec}\{R_{mn}\}$ denoting the vectorization of $R_{mn}$, m and n being indices running over the number of antenna elements of the antenna array.

FIG. 5j illustrates a representation of channel covariance, the representation comprising the elements of the set of FIG. 5i.

FIG. 5k illustrates a parametrisation of the representative geometrical relationships of FIG. 5i. According to an aspect, the four displacement vectors of the set illustrated in FIG. 5k are represented by the real valued parameters a, b, c, d, e, f and g, such that the null vector is represented by a and the others are represented by b-ic, d-ie, f-ig, respectively, where i is the imaginary unit, such that $i^2=-1$.

FIG. 5l illustrates a covariance matrix based on the parametrisation illustrated in FIG. 5k of the representative geometrical relationships of FIG. 5i and the representation of channel covariance illustrated in FIG. 5j.

According to this aspect, as illustrated in FIG. 5l, the covariance matrix $R_{mn}$ is represented by $$R_{mn} = \begin{matrix} & 1 & 2 & 3 & 4 \\ 1 & \begin{bmatrix} a & b-ic & d-ie & f-ig \\ 2 & b+ic & a & b-ic & d-ie \\ 3 & d+ie & b+ic & a & b-ic \\ 4 & f+ig & d+ie & b+ic & a \end{bmatrix} \end{matrix} \qquad (2)$$

wherein the numbers 1-4 indicating the respective antenna element, as numbered in FIG. 5a, have been added for clarity. Then, using $$\text{vec}\{R_{mn}\} = \begin{bmatrix} a \\ b+ic \\ d+ie \\ f+ig \\ b-ic \\ a \\ b+ic \\ d+ie \\ d-ie \\ b-ic \\ a \\ b+ic \\ f-ig \\ d-ie \\ b-ic \\ a \end{bmatrix} \qquad (3)$$

P and $\beta$ as determined by equation (1) above, are, according to an aspect, defined by $$P = \begin{bmatrix} 1 & 0 & 0 & 0 & 0 & 0 & 0 \\ 0 & 1 & i & 0 & 0 & 0 & 0 \\ 0 & 0 & 0 & 1 & i & 0 & 0 \\ 0 & 0 & 0 & 0 & 0 & 1 & i \\ 0 & 1 & -i & 0 & 0 & 0 & 0 \\ 1 & 0 & 0 & 0 & 0 & 0 & 0 \\ 0 & 1 & i & 0 & 0 & 0 & 0 \\ 0 & 0 & 0 & 1 & i & 0 & 0 \\ 0 & 0 & 0 & 1 & -i & 0 & 0 \\ 0 & 1 & -i & 0 & 0 & 0 & 0 \\ 1 & 0 & 0 & 0 & 0 & 0 & 0 \\ 0 & 1 & i & 0 & 0 & 0 & 0 \\ 0 & 0 & 0 & 0 & 0 & 1 & -i \\ 0 & 0 & 0 & 1 & -i & 0 & 0 \\ 0 & 1 & -i & 0 & 0 & 0 & 0 \\ 1 & 0 & 0 & 0 & 0 & 0 & 0 \end{bmatrix} \text{ and} \qquad (4)$$

$$\beta = \begin{bmatrix} a \\ b \\ c \\ d \\ e \\ f \\ g \end{bmatrix}. \qquad (5)$$

Since P is based on the geometrical relationships, P is based on the structure of the antenna array.

For an M×N uniform planar antenna array, M and N being the number of antenna elements in each dimension, a corresponding covariance matrix holds $(M*N)^2$ elements. The indices m and n of equation (1) would thus run over (M*N) indices, respectively. A representation, such as the representation disclosed in relation to FIG. 5, generalised to an M×N uniform planar antenna array, has 2*M*N−M−N+1 unique elements that needs to be determined. For an antenna array where M and N are large, the complexity reduction approaches M*N/2.

5G is the next step of evolution in mobile communication. One of the main aims of 5G is to provide ubiquitous connectivity for any kind of device and any kind of application that may benefit from being connected. While mobile broadband will continue to be important and will drive the need for higher system capacity and higher data rates, 5G will also provide wireless connectivity for a wide range of new applications and use cases, including wearables, smart homes, traffic safety/control, and critical infrastructure and industry applications, as well as for very-high-speed media delivery. The use of large antenna arrays is believed to become an integral part of 5G.

According to an aspect for a 20×10 antenna array, which is in the range of what is studied for 5G evolution, this means that the number of unique elements that needs to be determined can be reduced by about a factor of 100. Such a representation, when used for CSI reporting and storage of CSI reports, can potentially improve performance of compression by about a factor of M*N/2 for an M×N uniform planar antenna array. In addition to beamforming applications, the disclosed method can also significantly improve performance in other applications involving large antenna arrays, such as coordinated multipoint transmission, CoMP, and massive multiple-input multiple-output, MIMO.

Figure 6:
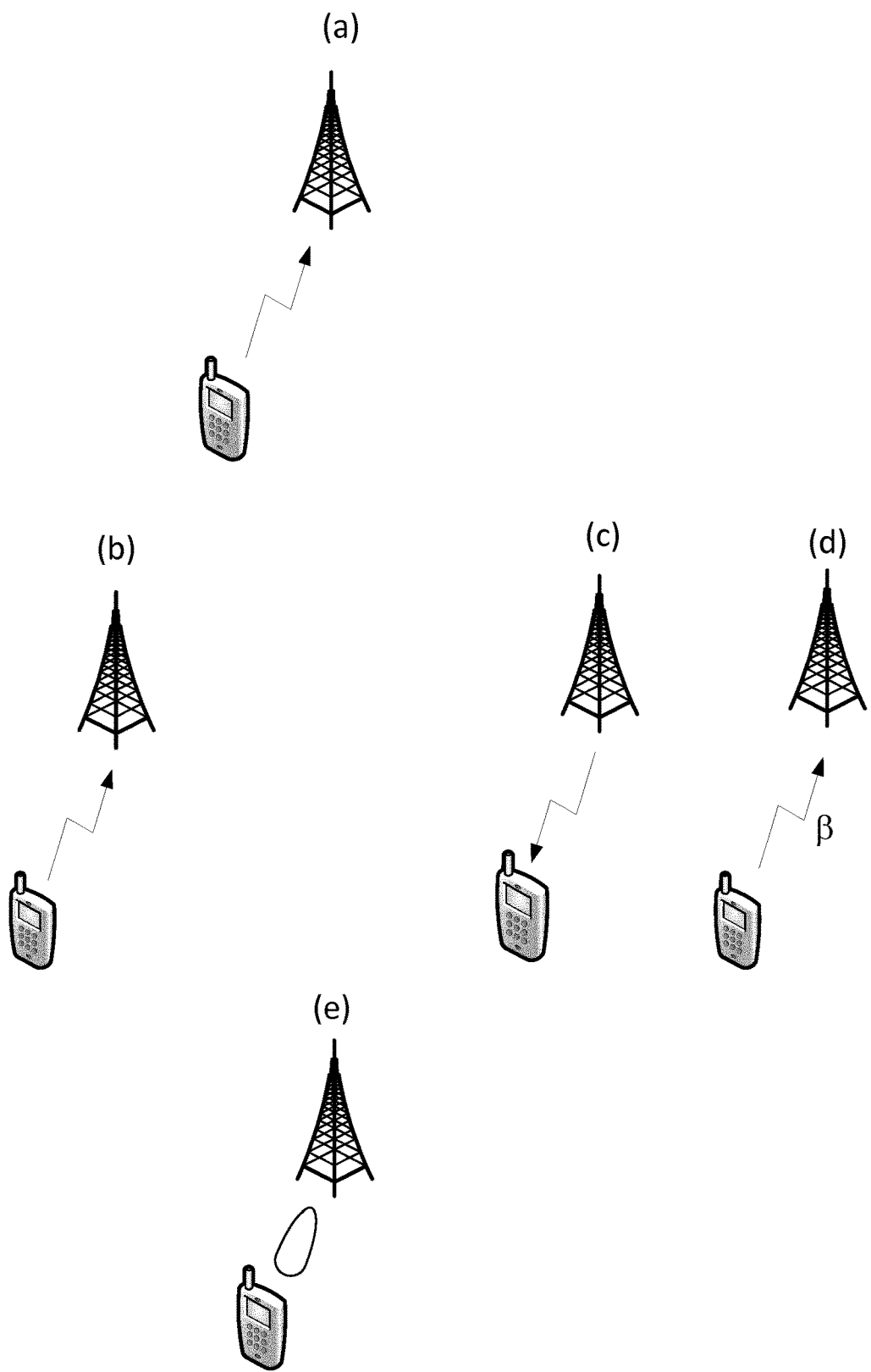
FIG. 6 illustrates aspects of the method used in uplink and downlink in a communication network.

FIG. 6 illustrates aspects of the method used in uplink and downlink in a communication network. FIG. 6a illustrates an aspect of processing S7 antenna characteristics based on a representation P(β) in uplink, while FIGS. 6b-6e relate to aspects of processing S7 antenna characteristics, based on a representation P(β), in downlink.

FIGS. 6a and 6e illustrate an aspect where a base station performs measurements on signals from a wireless device, FIG. 6a, and then estimates β based on the measurements, and then uses the estimated β in a beamforming application, FIG. 6e.

FIGS. 6c-6e illustrate an aspect where a wireless device performs measurements on signals from a base station received in downlink, FIG. 6c, then estimates β based on the measurements and transmits the estimated β to the base station, FIG. 6d, wherein the base station uses the estimated β in a beamforming application, FIG. 6e.

These aspects are described in further detail below.

FIG. 6a illustrates an aspect of the disclosed method used in uplink in a communication network comprising a base station and a wireless device. The base station comprises an antenna array, wherein the antenna array has a plurality of antenna elements. According to an aspect, geometrical relationships between all pairs of antenna elements in a spatial layout of the antenna array have been obtained S1 during manufacturing of the antenna array. All pairs of antenna elements have been classified S3 into sets based on the obtained geometrical relationships, wherein all pairs of antenna elements in a set have substantially equal geometrical relationship in the spatial layout. According to an aspect, the classification S3 is done during a step of configuration of the antenna array, prior to operational use of the antenna array. A representation of channel characteristics as P(β) has been determined S5, wherein argument β is a vector of elements, each element relating to a magnitude and/or phase of covariance between the antenna elements in the set, and P is a mapping function based on the classifying S3. According to an aspect, the determination S5 of the representation P(β) is done during a step of configuration of the antenna array, prior to operational use of the antenna array. According to another aspect, P is determined at the base station based on uplink measurements. According to yet another aspect, P is determined at the base station based on reporting from the wireless device.

In uplink, the wireless device signals the base station. Processing S7 antenna characteristics based on said representation P(β) is done at the base station using the received signals. According to an aspect of the disclosure, a measurement is performed S71 at the base station on at least one of the received signals and elements of β are estimated S72 based on the measurement. According to a further aspect of the disclosure, the step of performing S71 a measurement on at least one of the received signals is based on a signal representing a set obtained in the classifying S3. In another aspect of the disclosure, the step of performing S71 a measurement on at least one of the received signals is based on a processing S73 of a plurality of signals representing respective plurality of pairs of a set obtained in the classifying S3 According to an aspect, the processing of a plurality of signals comprises an averaging of the plurality of signals. According to a further aspect, the processing of a plurality of signals comprises a weighted averaging of the plurality of signals.

According to an aspect, the step of processing S7 comprises performing S75 a signal processing operation involving the covariance between antenna elements, the signal processing operation being expressed as a function of the elements of β. According to a further aspect, the step of performing S75 a signal processing operation comprises determining S76 at least one weight vector w based on the elements of β, the weight vector w consisting of antenna weights being used to adjust magnitude and/or phase of signals to and from antenna elements of the antenna array. The channel estimates are thus used to combine the signals received by different antennas in a form of receiver beamforming. If signals from multiple antennas are received, and the combination is done to match the channel for a given user and different users typically have different channels, the received signal to noise and interference ratio, SINR, often increases significantly which in turn can often improve spectral efficiency of a communication system, in terms of, e.g., bits/sec/Hz.

According to some aspects, β is used to process S7 antenna characteristics in downlink. In order to do so, β must first be estimated. According to an aspect, this is done at the base station using information received in uplink, as will be further illustrated in FIGS. 6b and 6e. According to another aspect, β is estimated at the wireless device and then transmitted from the wireless device to the base station for use in processing S7 antenna characteristics, as will be further illustrated in FIGS. 6c-6e.

FIG. 6b illustrates an aspect of the disclosed method where Channel State Information, CSI, is processed at a base station, BS, using information received in uplink. The base station comprises an antenna array, wherein the antenna array has a plurality of antenna elements. Geometrical relationships between all pairs of antenna elements in a spatial layout of the antenna array have been obtained S1. All pairs of antenna elements have been classified S3 into sets based on the obtained geometrical relationships, wherein all pairs of antenna elements in a set have substantially equal geometrical relationship in the spatial layout. A representation of channel characteristics as P(β) has been determined S5, wherein argument β is a vector of elements, each element relating to a magnitude and/or phase of covariance between the antenna elements in the set, and P is a mapping function based on the classifying S3.

According to an aspect, the wireless device transmits a reference signal in the uplink. According to a further aspect, the reference signal is a Sounding Reference Signal, SRS, or a Demodulation Reference Signal, DMRS, per sub frame. The base station measures S71 the signals transmitted from the wireless device in the uplink and elements of β are estimated based on the measurement. According to a further aspect, the estimation of β is then used for beamforming purposes, as is described in relation to FIG. 6 below.

FIG. 6c illustrates an aspect of the disclosed method where CSI received in downlink is processed at a wireless device.

The base station comprises an antenna array, wherein the antenna array has a plurality of antenna elements. Geometrical relationships between all pairs of antenna elements in a spatial layout of the antenna array have been obtained S1. All pairs of antenna elements have been classified S3 into sets based on the obtained geometrical relationships, wherein all pairs of antenna elements in a set have substantially equal geometrical relationship in the spatial layout. A representation of channel characteristics as P(β) has been determined S5, wherein argument β is a vector of elements, each element relating to a magnitude and/or phase of covariance between the antenna elements in the set, and P is a mapping function based on the classifying S3.

For the wireless device to be able to estimate β, it must have information about the representation P(β).

Turning back to the block diagram of FIG. 3, processing S7 antenna characteristics comprises the base station transmitting S77 information relating to P to the wireless device, the information relating to P enabling estimation of β based on a measured signal.

According to an aspect, the information relating to P comprises the representation P(β).

According to a further aspect, P is a matrix defined by $$\text{vec}\{R_{mn}\} = P\beta \tag{6}$$

wherein covariance between antenna elements is represented by a covariance matrix $R_{mn}$, $\text{vec}\{R_{mn}\}$ denoting the vectorization of $R_{mn}$, m and n being indices running over the number of antenna elements of the antenna array, and P is transmitted to the wireless device.

According to another aspect, the representation P(β) is stored in the wireless device and the information relating to P, transmitted S77 to the wireless device, comprises an indication relating to the representation P(β). According to an aspect, the indication is an index and the wireless device selects the representation P(β) based on the index.

According to an aspect, the wireless device performs S71 a measurement on signals received from the base station, as illustrated in FIG. 6c. According to a further aspect, the base station is part of a Long Term Evolution, LTE, network and transmits a plurality of CSI-RS, one per antenna. The wireless device estimates S72 elements of β based on the measurement on the received signals.

FIG. 6d illustrates an aspect of the disclosed method where information relating to a vector β is transmitted to a base station, wherein the vector β relates to a representation P(β) determined according to the disclosed method. According to an aspect, the information relating to β comprises β.

FIG. 6e illustrates an aspect of the disclosed method where the antenna characteristics of a base station, BS, is processed in a beamforming application in downlink. According to an aspect, processing S7 the antenna characteristics comprises performing S75 a signal processing operation involving the covariance between antenna elements, wherein the signal processing operation is expressed as a function of the elements of β. According to an aspect, the signal processing operation is based on a reference signal transmitted by a wireless device in the uplink, as illustrated in FIG. 6b. According to another aspect, the signal processing operation is based on information relating to β, the information relating to β being transmitted S74 to the base station from a wireless device, as illustrated in FIG. 6d. According to a further aspect, performing S75 the signal processing operation comprises determining S76 at least one weight vector w based on the elements of β, the weight vector w consisting of antenna weights being used to adjust magnitude and phase of signals to and from antenna elements of the antenna array.

According to an aspect, determining S76 at least one weight vector w comprises evaluating the effect of the at least one weight vector w on a channel gain s, the channel gain being approximated by $$s = E\{|w^H h|^2\} \tag{7}$$

wherein E{ } denotes the expectation value of the expression inside the curly brackets, h is a channel vector and superscript H denotes a Hermitian transpose. According to a further aspect, a covariance matrix R is defined as $$R = E\{hh^H\} \tag{8}$$

According to a further aspect of the disclosure, the step of evaluating the effect of the at least one weight vector w on a channel gain s relates the channel gain s to the covariance matrix R by $$s = w^H R w \tag{9}$$

wherein R is related to the representation P(β).

The expression in equation (9) can be written explicitly as a double sum of antenna element indices k, m, such that $$s = \sum_k \sum_m w_k^H R_{km} w_m. \tag{10}$$

wherein the number of unique elements of R will be determined by the representation P(β).

According to one aspect of the disclosure, the sums $$\sum_u \sum_v w_u^H w_v \qquad (11)$$

are pre-calculated and stored in a vector wwU, where indices u and v correspond to replicates of the unique values of the covariance matrix R, the vector wwU having a length equal to the number of unique elements of R. According to a further aspect, the sum of equation (10) is evaluated by $$s = \sum_n (wwU_n \cdot Ru_n) \qquad (12)$$

wherein Ru is a vector comprising the unique values of R.

According to an aspect, the channel gain is evaluated according to equation (7) for a uniform linear antenna comprising four antenna elements, whose covariance matrix R and corresponding representation P and β are defined by equations (2), (4) and (5), respectively. The vector Ru of equation (12) will then correspond to β of equation (5).

FIG. 7 illustrates an aspect of error tolerance when determining a representation. According to an aspect of the disclosure, determining S5 a representation comprises an error tolerance, such that $$P(\beta) \approx R \qquad (13)$$

within the error tolerance, wherein ≈ denotes approximately equal to, and covariance between antenna elements is represented by a covariance matrix R.

FIG. 7a illustrates an antenna array comprising four antenna elements, wherein one antenna element is out of alignment with the other three. Using $\vec{d}$ to represent displacement vectors $d_{mn}$, wherein the displacement vectors are obtained S1 as described in relation to FIGS. 4 and 5, between nearest neighbour antenna pairs 1-2 and 2-3, that is $d_{12}$ and $d_{23}$, the displacement vector $d_{34}$ can be written as $\vec{d}+\vec{\delta d}$, wherein $\vec{\delta d}$ represent an offset or error from having the geometrical relationship between antenna elements 3-4 to be $\vec{d}$.

FIG. 7b illustrates an aspect of the disclosed method, wherein the representation of channel characteristics comprises an error tolerance. According to an aspect, the error tolerance is represented by a norm $\|\delta d_{max}\|$ relating to a maximum norm of the difference between the geometrical relationship reference $\vec{d}$ and a geometrical relationship between a pair of antenna elements. According to an aspect, the norm $\|\delta d_{max}\|$ is used to classify S3 pairs of antenna elements into sets, wherein all pairs of antenna elements in a set have substantially equal geometrical relationship in the spatial layout if they do not differ more than the above-mentioned norm with respect to a representative geometrical relationship. The representation P(β)≈R is determined S5 based on the sets obtained in the classification S3 of pairs of antenna elements.

Figure 8:
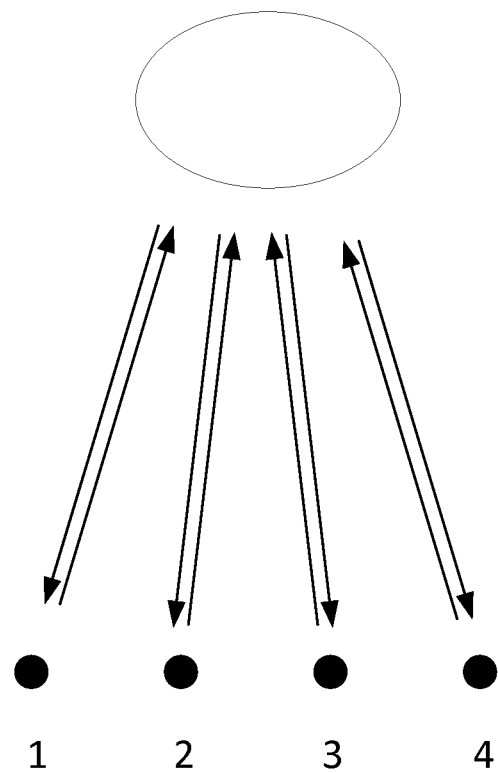
FIG. 8 illustrates an aspect of the method used for radar.

FIG. 8 illustrates an aspect of the method used for radar. The radar comprises an antenna array, wherein the antenna array is a uniform linear antenna array comprising four antenna elements. The four antenna elements are represented by black dots. The oval shape represents an object upon which radar waves are reflected, wherein the radar waves are represented by arrows to and from the antenna elements. The antenna array illustrated in FIG. 8 functions as both a transmit node and a receive node in a communication system. According to an aspect, handling channel characteristics comprises representing channel covariance with a channel covariance matrix defined by equation (2) and defining a representation according to equation (1), wherein P and β are represented by equations (4) and (5), respectively.

The radar arrangement illustrated in FIG. 8 is, according to some aspects, implemented in a vehicle, such as a car or a truck, where it forms part of a system for autonomous driving of the vehicle, and/or a system for vehicle safety, such as a collision avoidance system.

Figure 9:
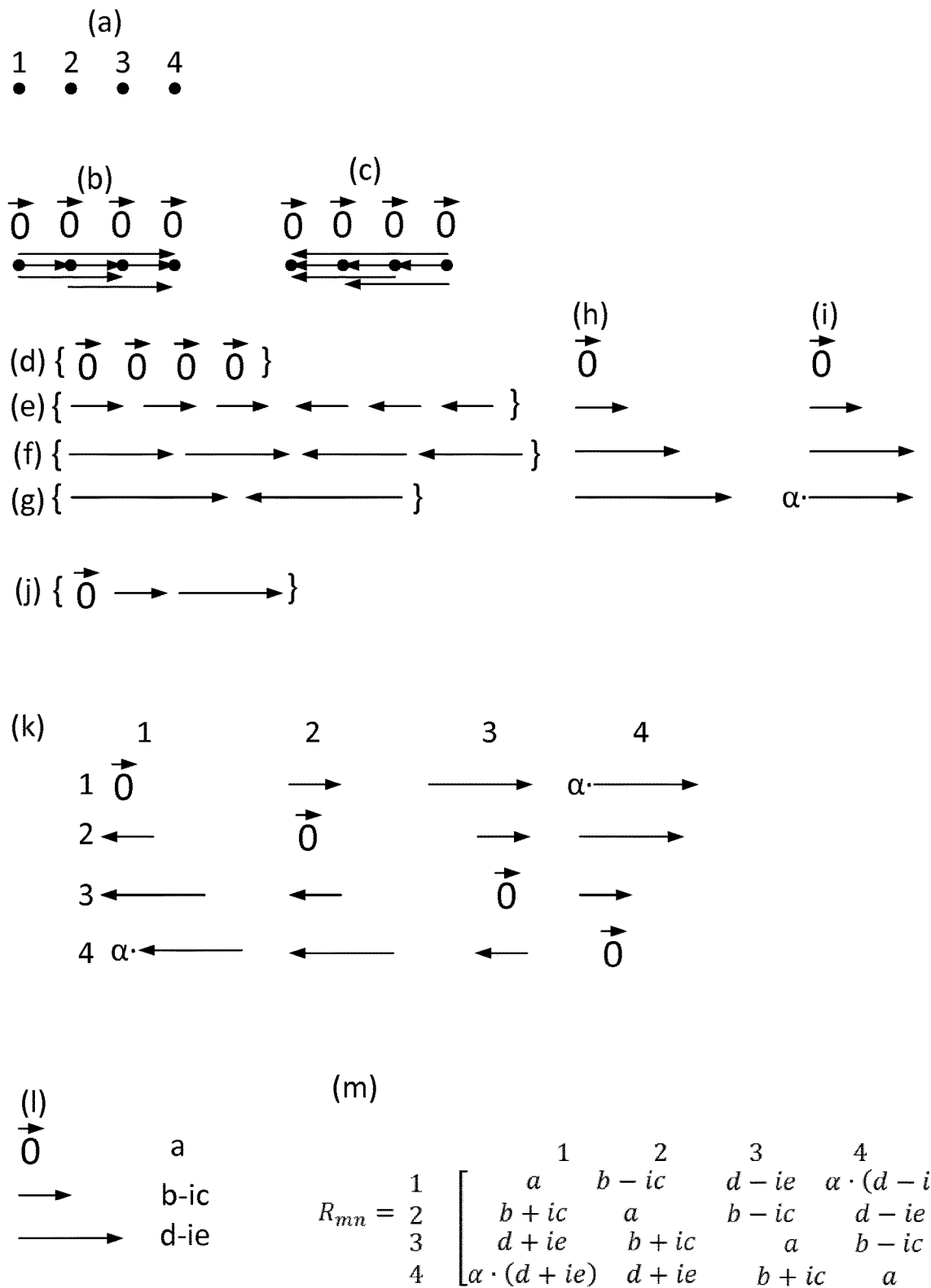
FIG. 9 illustrates an aspect of the method for a uniform linear array comprising four antenna elements, in analogy with FIG. 5, but wherein the representation comprises fewer unique elements.
Figure 10:
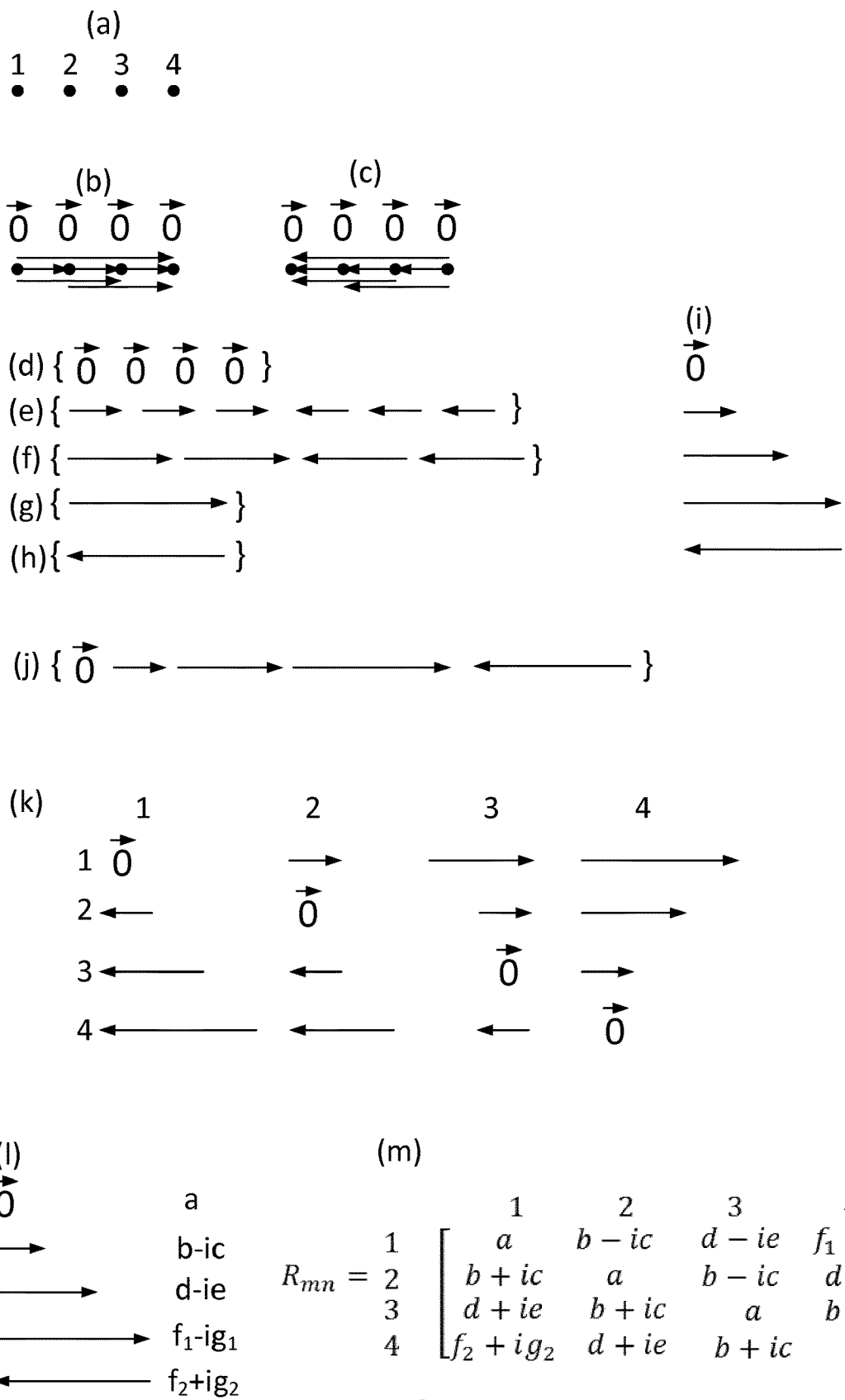
FIG. 10 illustrates an aspect of the method for a uniform linear array comprising four antenna elements, in analogy with FIG. 5, but wherein the representation comprises more unique elements.

According to some aspects it is desirable to not consider all possible pairs when obtaining S1 geometrical relationships. According to some aspects it is desirable to adjust the number of sets in when classifying S3 all pairs of antenna elements into sets. By doing so, physical and computational aspects may be taken into account when forming the representation P(β). FIGS. 9 and 10 demonstrate two embodiments, which when compared to the aspect disclosed in FIG. 5, decreases and increases, respectively, the number of parameters comprised in β.

FIG. 9 illustrates an aspect of the method for a uniform linear array comprising four antenna elements, in analogy with FIG. 5, but wherein the representation comprises fewer unique elements.

FIG. 9a illustrates the antenna elements, represented as black dots, and FIGS. 9b and 9c illustrate geometrical relationships between antenna elements, the geometrical relationships being represented by displacement vectors.

FIGS. 9d-g illustrate sets comprising subsets of the geometrical relationships of FIGS. 9b and c, each set comprising geometrical relationships that have been classified to have substantially equal geometrical relationship in the spatial layout.

FIG. 9h illustrates representative geometrical relationships, each corresponding to a respective set of FIGS. 9d-g. According to some aspects, it is desirable to represent one or more representative geometrical relationships in terms of other geometrical relationships.

FIG. 9i illustrate one of the representative geometrical relationships of FIG. 9h being represented by another of the representative geometrical relationships of FIG. 9h multiplied with a scaling factor α. The geometrical relationships between antenna elements 1 and 4 are thus represented by a scaling of a geometrical relationship representative of the geometrical relationships between next nearest neighbour pairs of antenna elements.

FIG. 9j illustrates a set comprising the unique representative geometrical relationships of FIG. 9i. Since the geometrical relationship between antenna elements 1 and 4 of FIG. 9h can be represented by a scaled geometrical relationship representative of another set of geometrical relationships, it is omitted.

FIG. 9k illustrates a representation of channel covariance, the representation comprising the representative geometrical relationships of FIG. 9j.

FIG. 9l illustrates a parametrisation of the representative geometrical relationships of FIGS. 9i and j. Since one of the representative geometrical relationships of FIG. 9h is described in terms of another, only five parameters, a-e, are needed.

FIG. 9m illustrates a covariance matrix based on the parametrisation illustrated in FIG. 9l of the representative geometrical relationships of FIGS. 9i and j, and the representation of channel covariance illustrated in FIG. 9k.

According to a further aspect of the disclosure, β comprises the real valued parameters a, b, c, d and e.

FIG. 10 illustrates an aspect of the method for a uniform linear array comprising four antenna elements, in analogy with FIG. 5, but wherein the representation comprises more unique elements.

FIG. 10a illustrates the antenna elements, represented as black dots, and FIGS. 10b and 10c illustrate geometrical relationships between antenna elements, the geometrical relationships being represented by displacement vectors.

FIGS. 10d-h illustrate sets comprising subsets of the geometrical relationships of FIGS. 10b and c, each set comprising geometrical relationships that have been classified to have substantially equal geometrical relationship in the spatial layout, but wherein the geometrical relationships between the outmost antenna elements have been classified S3 into separate sets (FIGS. 10g and h).

FIG. 10i illustrates representative geometrical relationships corresponding to a respective set of FIGS. 10d-h.

FIG. 10j illustrates a set comprising the representative geometrical relationships of FIG. 10i.

FIG. 10k illustrates a representation of channel covariance, wherein the representation comprises the representative geometrical relationships of FIGS. 10i and j.

FIG. 10l illustrates a parametrisation of the representative geometrical relationships of FIGS. 10i and j. Since the geometrical relationships between antenna elements 1 and 4 are classified into different sets, an extra representative geometrical relationship needs to be parametrised. The geometrical relationships are represented by real valued parameters a, b, c, d, e, $f_1$, $f_2$, $g_1$ and $g_2$, as illustrated in FIG. 10l.

FIG. 10m illustrates a covariance matrix based on the parametrisation illustrated in FIG. 10l of the representative geometrical relationships of FIGS. 10i and j, and the representation of channel covariance illustrated in FIG. 10k. According to an aspect of the disclosure, β comprises the real valued parameters a-$g_2$, which is two parameters more than if the antenna pairs relating to displacement vectors $d_{14}$ and $d_{41}$ had been classified S3 to belong to the same set.

According to some aspects of the disclosure, the method is applied to a plurality of antenna arrays. The plurality of antenna arrays can be seen as one antenna system, for which an aspect of the present disclosure is applied.

FIG. 11 illustrates an aspect of the method for two base stations.

FIG. 11a illustrates two base stations in a network, each base station comprising a uniform linear antenna array, wherein the respective antenna array comprises four antenna elements.

FIG. 11b illustrates representations of geometrical relationships between all pairs of antenna elements of the antenna arrays. BS1r and BS2r illustrate representations of geometrical relationships for base stations BS1 and BS2, respectively. BS1-BS2r illustrates representations of geometrical relationships for antenna pairs between the two base stations.

Typically the distance between nodes of a network will be much greater than the spacing between antenna elements of an antenna in a node. In such cases, the representations of geometrical relationships illustrated in BS1-BS2r will be nearly parallel.

FIG. 11c illustrates representations of two geometrical relationships. An increase in the distance between the base stations will decrease the angle between the representations of the two geometrical relationships. If the distance between the base stations is much greater than the spacing between antenna elements of the respective base stations, the situation illustrated in FIG. 11d arises, where the two geometrical relationships are substantially equal, to within an error δd.

According to an aspect of the disclosure, a subset of the inter-antenna pairs of antenna elements are classified S3 to belong to the same set, based on the obtained S1 geometrical relationships illustrated in BS1-BS2r, wherein all pairs of antenna elements in the set have substantially equal geometrical relationship in the spatial layout. Thus, only a subset of the geometrical relationships illustrated in BS1-BS2r will be considered unique.

According to a further aspect of the disclosure, all inter-antenna pairs of antenna elements are classified S3 to belong to the same set, based on the obtained S1 geometrical relationships illustrated in BS1-BS2r, wherein all pairs of antenna elements in the set have substantially equal geometrical relationship in the spatial layout. Thus, the geometrical relationships illustrated in BS1-BS2r can be represented by a single representative geometrical relationship.

FIG. 11e illustrates a covariance matrix according to an aspect. The blocks R_BS1toB2 and R_BS2toB2 represent channel covariance between base stations BS1 and BS2.

According to an aspect where only a subset of the geometrical relationships illustrated in BS1-BS2r will are classified as unique, a parameterization of covariance matrix elements of the blocks R_BS1toB2 and R_BS2toB2 will result in fewer unique covariance matrix elements than if all inter-antenna channels were considered individually.

Figure 12:
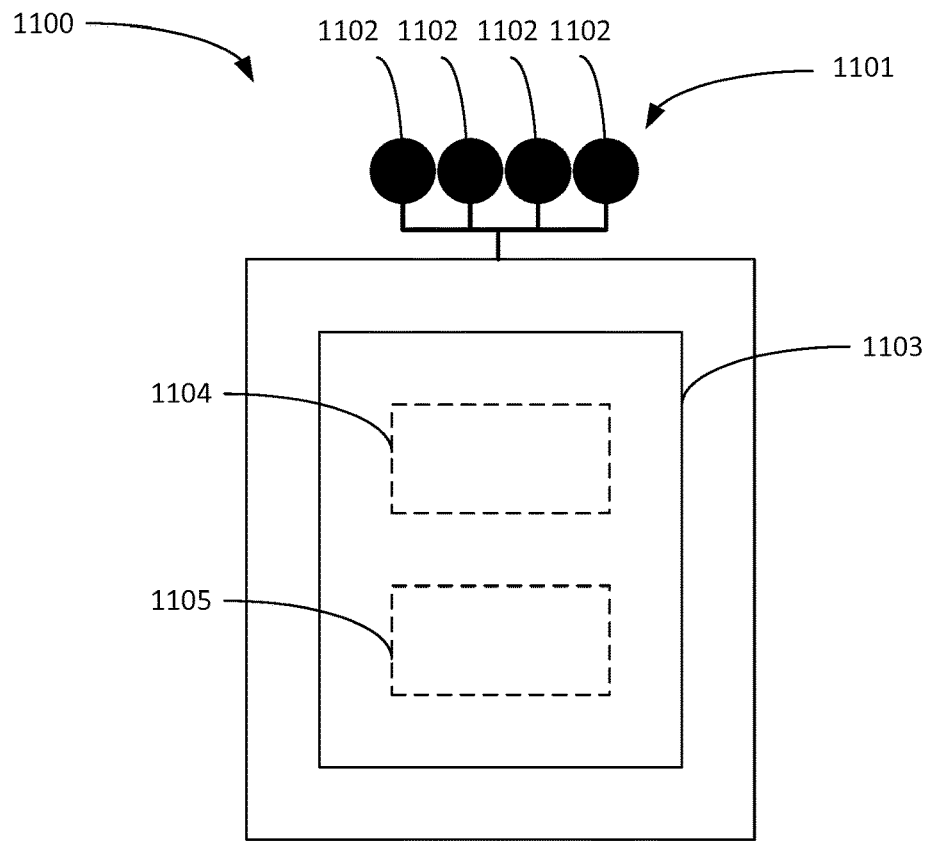
FIG. 12 illustrates a network node arranged to handle channel characteristics for an antenna array according to an aspect of the disclosure.

FIG. 12 illustrates a network node arranged to handle channel characteristics for an antenna array according to an aspect of the disclosure. The network node 1100 comprises an antenna array 1101, wherein the antenna array 1101 has a plurality of antenna elements 1102. The network node 1100 further comprising processing means 1103 adapted to obtaining S1 geometrical relationships between any pair of antenna elements 1102 in a spatial layout of the antenna array 1101, classifying S3 all pairs of antenna elements 1102 into sets based on the obtained geometrical relationships, wherein all pairs of antenna elements 1102 in a set have substantially equal geometrical relationship in the spatial layout, determining S5 a representation of channel characteristics as P(β), wherein argument β is a vector of elements, each element relating to a magnitude and/or phase of covariance between the antenna elements 1102 in the set, and P is a mapping function based on the classifying S3, and processing S7 antenna characteristics based on said representation P(β).

According to an aspect, the processing means 1103 comprise a processor 1104 and a memory 1105 wherein said memory 1105 is containing instructions executable by said processor 1104.

The present disclosure also relates to modules for handling channel characteristics for an antenna array of a network node in a communication system, according to an aspect of the disclosure, wherein the antenna array has a plurality of antenna elements.

Figure 13:
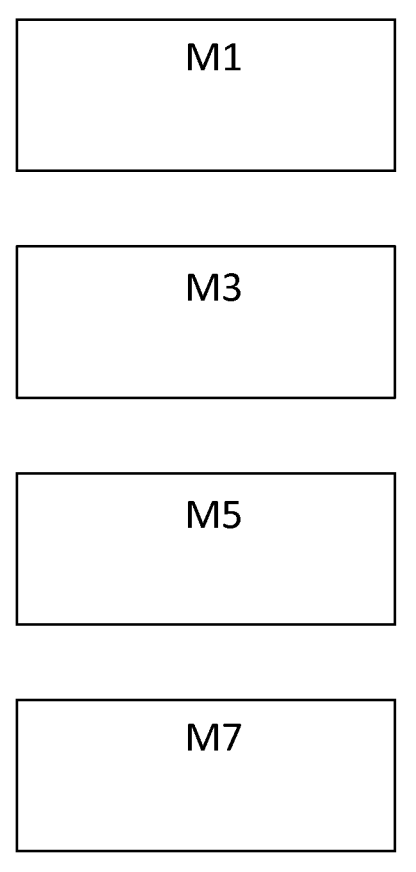

FIG. 13 illustrates modules for handling channel characteristics for an antenna array in a communication system, according to an aspect of the disclosure. According to a further aspect, the modules are comprised in a terminal.

According to an aspect, one module is a geometrical relationship obtaining module for obtaining S1 geometrical relationships between any pair of antenna elements in a spatial layout of the antenna array.

According to an aspect, one module is a classifying module for classifying S3 all pairs of antenna elements into sets based on the obtained geometrical relationships, wherein all pairs of antenna elements in a set have substantially equal geometrical relationship in the spatial layout, According to an aspect, one module is a representation determining module for determining S5 a representation of channel characteristics as P(β), wherein argument β is a vector of elements, each element relating to a magnitude and/or phase of covariance between the antenna elements in the set, and P is a mapping function based on the classifying S3.

According to an aspect, one module is a processing module for processing (S7) antenna characteristics based on said representation P(β).

The present disclosure also relates to a computer program for causing a computer to handle channel characteristics for an antenna array in a communication system, wherein the antenna array has a plurality of antenna elements.

The computer program comprises computer readable code means which, when run on a computer, causes the computer to obtain S1 geometrical relationships between any pair of antenna elements in a spatial layout of the antenna array.

The computer program comprises computer readable code means which, when run on a computer, causes the computer to classify S3 all pairs of antenna elements into sets based on the obtained geometrical relationships, wherein all pairs of antenna elements in a set have substantially equal geometrical relationship in the spatial layout.

The computer program comprises computer readable code means which, when run on a computer, causes the computer to determining S5 a representation of channel characteristics as P(β), wherein argument β is a vector of elements, each element relating to a magnitude and/or phase of covariance between the antenna elements in the set, and P is a mapping function based on the classifying S3.

The computer program comprises computer readable code means which, when run on a computer, causes the computer to process S7 antenna characteristics based on said representation P(β).

According to one aspect, the computer program comprises computer readable code means for causing a computer to switch between at least two different representations P(β).

Figure 14:
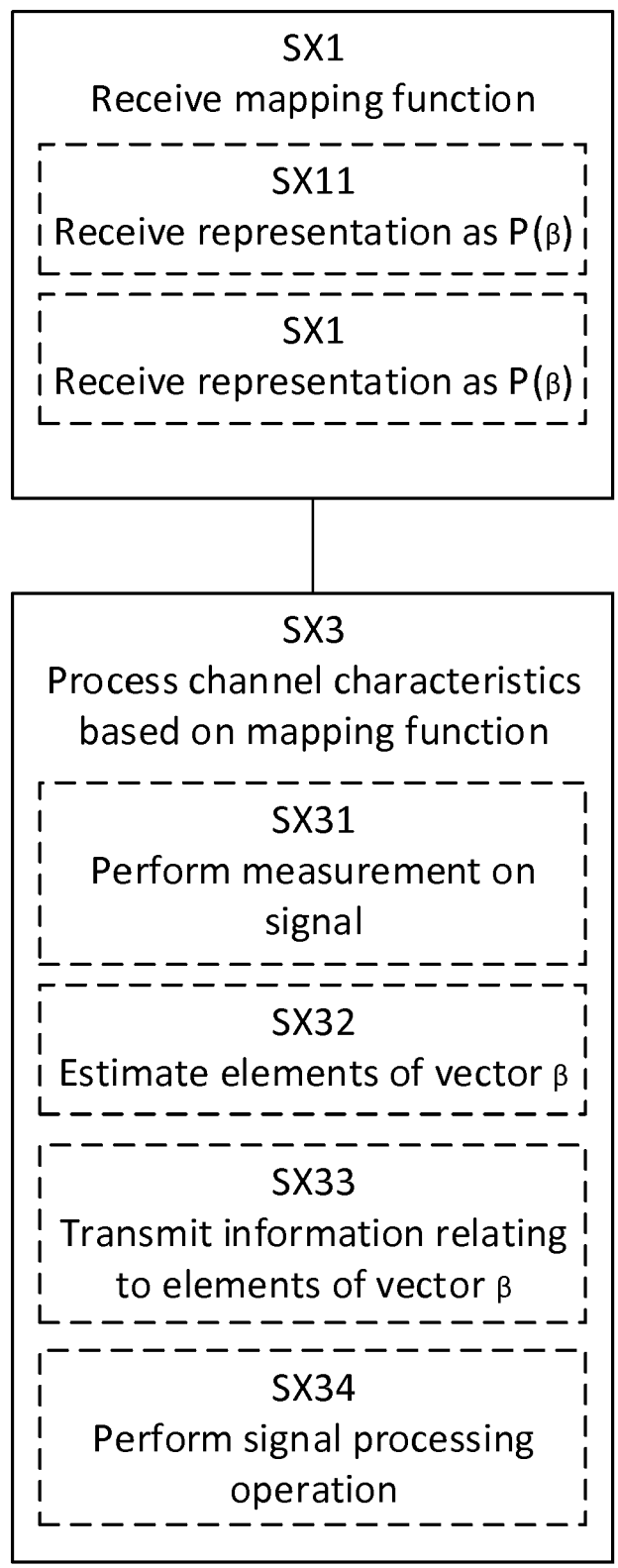
FIG. 14 illustrates methods for handling channel characteristics for an antenna array in a communication system.

With reference to FIG. 14, there is disclosed herein a method, performed in a wireless device O1, for channel characteristics handling for an antenna array A1 in a communication system, wherein the antenna array has a plurality of antenna elements. the method comprises receiving SX1 a mapping function P( ) based on a classifying of pairs of the antenna elements into sets, wherein all pairs of antenna elements in a set have substantially equal geometrical relationship in a spatial layout of the antenna elements in the antenna array, and processing SX3 channel characteristics related to the antenna array based on said mapping function P( ).

Hereby the wireless device benefits from a number of advantages. For instance, an advantage of this solution is that estimation of channel characteristics, by the wireless device, in the form of channel covariance can be performed with similar quality, but lower complexity than prior art methods. Another advantage is that Channel State Information, CSI, reporting, and storage of CSI reports, by the wireless device, can be made more efficient. A further advantage is that the traffic load of inter-node, such as an uplink or downlink between a network node and the wireless device is reduced. A yet further advantage is that memory requirements are reduced when it comes to storing channel characteristics. Another advantage is that signal processing operations relating to channel characteristics can be made more efficient in terms of implementation.

According to some aspects, the receiving SX1 further comprises receiving SX11 a representation of the channel characteristics as P(β), wherein argument β is a vector of elements, each element relating to a magnitude and/or a phase of a covariance between antenna elements of the antenna array.

Thus, by the present technique the full channel covariance matrix does not need to be communicated, but rather a representation of the channel characteristics as P(β). This allows for enhanced efficiency and reduced traffic load in, e.g., uplink and downlink from and to the wireless device.

According to some other aspects, the processing SX3 further comprises performing SX31 a measurement on at least one signal and estimating SX32 elements of a vector β based on the performed measurement, each element of the vector β relating to a magnitude and/or a phase of a covariance between antenna elements of the antenna array, wherein P(β) is a representation of the channel characteristics.

As mentioned above in discussions regarding the network nodes disclosed herein, signal processing operations for estimating elements of the vector β are according to some aspects equivalent to estimating the full channel covariance matrix, but may be implemented in a more efficient way by the wireless device. Consequently, according to some aspects, the processing SX3 comprises performing SX34 a signal processing operation involving a covariance between antenna elements of the antenna array, the signal processing operation being expressed as a function of the elements of β.

According to some further aspects, the processing SX3 is based on said representation P(β).

As mentioned above in discussions regarding the network nodes disclosed herein, communicating channel characteristics, and channel covariance matrices in particular, is more efficiently achieved through the present technique. Thus, according to some aspects, the processing SX3 comprises transmitting SX33 information relating to elements of a vector β, each element relating to a magnitude and/or a phase of a covariance between antenna elements of the antenna array, wherein P(β) is a representation of the channel characteristics.

According to some aspects, the mapping function P( ) is a matrix defined by $$\text{vec}\{R_{mn}\} = P\beta$$

wherein covariance between antenna elements is represented by a covariance matrix $R_{mn}$, vec$\{R_{mn}\}$ denoting a vectorization of $R_{mn}$, m and n being indices running over the number of antenna elements of the antenna array.

There is also disclosed herein a wireless device O1 configured for channel characteristics handling for an antenna array in a communication system, wherein the antenna array has a plurality of antenna elements.

Figure 15:
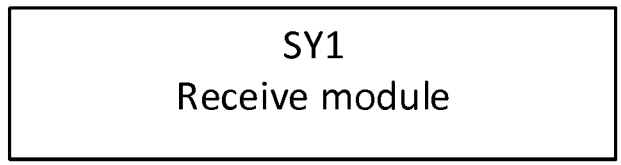
FIG. 15 illustrates modules of a wireless device for handling channel characteristics for an antenna array in a communication system.
Figure 15:
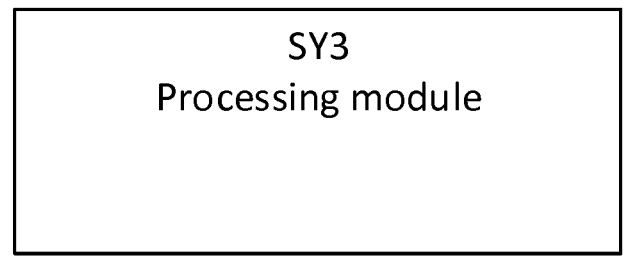

With reference to FIG. 15, the wireless device comprises a receiving module SY1 configured to receive a mapping function P( ) based on a classifying of pairs of the antenna elements into sets, wherein all pairs of antenna elements in a set have substantially equal geometrical relationship in a spatial layout of the antenna elements in the antenna array, and a processing module SY3 configured to process channel characteristics related to the antenna array based on said mapping function P( ).

According to some aspects, the receiving module SY1 is further configured to receive a representation of the channel characteristics as P($\beta$), wherein argument $\beta$ is a vector of elements, each element relating to a magnitude and/or a phase of a covariance between antenna elements of the antenna array.

According to some aspects, the processing module SY3 is further configured to perform a measurement on at least one signal and to estimate elements of a vector $\beta$ based on the performed measurement, each element of the vector $\beta$ relating to a magnitude and/or a phase of a covariance between antenna elements of the antenna array, wherein P($\beta$) is a representation of the channel characteristics.

According to some aspects, the processing module SY3 is configured to process the channel characteristics based on said representation P($\beta$).

According to some aspects, the processing module SY3 is configured to transmit information relating to elements of a vector $\beta$, each element relating to a magnitude and/or a phase of a covariance between antenna elements of the antenna array, wherein P($\beta$) is a representation of the channel characteristics.

According to some aspects, the processing module SY3 is further configured to perform a signal processing operation involving a covariance between antenna elements of the antenna array, the signal processing operation being expressed as a function of the elements of $\beta$.

The wireless device has already been discussed in connection to the methods performed in a wireless device above.

The invention claimed is:

1. A method, performed in a network node, for channel characteristics handling for an antenna array in a communication system, the antenna array having a plurality of antenna elements, the method comprising:
    obtaining geometrical relationships between any pair of antenna elements in a spatial layout of the antenna array;
    classifying all pairs of antenna elements into sets based on the obtained geometrical relationships, all pairs of antenna elements in a set having substantially equal geometrical relationship in the spatial layout, a number of sets being equal to a number of unique geometrical relationships between the pairs of antenna elements;
    determining a representation of channel characteristics as P($\beta$), argument $\beta$ being a vector of elements, each element relating to a covariance between the antenna elements in a set, and P being a mapping function based on the classifying, the mapping function being a matrix having a dimension equal to a total number of unique covariances and a dimension equal to a dimension of the vector $\beta$, each element of the matrix being precalculated based on at least one of the unique covariances; and
    processing antenna characteristics based on the representation P($\beta$).

2. The method according to claim 1, wherein the step of processing antenna characteristics comprises performing a measurement on at least one signal and estimating elements of $\beta$ based on the measurement.

3. The method according to claim 2, wherein the step of performing a measurement on at least one signal is based on a processing of at least one signal representing respective at least one pair of a set obtained in the classifying.

4. The method according to claim 1, wherein the step of processing antenna characteristics comprises transmitting information relating to $\beta$.

5. The method according to claim 4, wherein the step of transmitting information relating to $\beta$ comprises transmitting information relating to $\beta$ between at least two network nodes.

6. The method according to claim 4, wherein the step of transmitting information relating to $\beta$ comprises transmitting information relating to $\beta$ to a memory.

7. The method according to claim 1, wherein the step of processing antenna characteristics comprises performing a signal processing operation involving the covariance between antenna elements, the signal processing operation being expressed as a function of the elements of $\beta$.

8. The method according to claim 7, wherein the step of performing a signal processing operation involving the covariance between antenna elements comprises determining at least one weight vector w based on the elements of $\beta$, the weight vector w consisting of antenna weights being used to adjust magnitude and/or phase of signals to and from antenna elements of the antenna array.

9. The method according to claim 1, wherein the step of processing antenna characteristics comprises transmitting information relating to P, the information relating to P enabling estimation of $\beta$ based on a measured signal.

10. The method according to claim 9, wherein the information relating to P comprises the representation P($\beta$).

11. The method according to claim 9, wherein the information relating to P comprises an indication relating to a representation P($\beta$) stored at a receiving node.

12. The method according to claim 1, wherein the step of determining a representation comprises an error tolerance, such that P($\beta$)≈R within the error tolerance, wherein ≈ denotes approximately equal to, and covariance between antenna elements is represented by a covariance matrix R.

13. The method according to claim 1, wherein P is a matrix defined by $$\text{vec}\{R_{mn}\} = P\beta$$

wherein covariance between antenna elements is represented by a covariance matrix $R_{mn}$, vec$\{R_{mn}\}$ denoting the vectorization of $R_{mn}$, m and n being indices running over the number of antenna elements of the antenna array.

14. The method according to claim 1, wherein the elements of $\beta$ are real-valued.

15. A network node configured to handle channel characteristics for an antenna array, the network node comprising an antenna array, the antenna array having a plurality of antenna elements, the network node further comprising processing means configured to:
    obtain geometrical relationships between any pair of antenna elements in a spatial layout of the antenna array;
    classify all pairs of antenna elements into sets based on the obtained geometrical relationships, all pairs of antenna elements in a set having substantially equal geometrical relationship in the spatial layout, a number of sets being equal to a number of unique geometrical relationships between the pairs of antenna elements;
    determine a representation of channel characteristics as P($\beta$), argument $\beta$ being a vector of elements, each element relating to a covariance between the antenna elements in the set, and P being a mapping function based on the classifying, the mapping function being a matrix having a dimension equal to a total number of unique covariances and a dimension equal to a dimension of the vector β, each element of the matrix being precalculated based on at least one of the unique covariances; and process antenna characteristics based on the representation P(β).

16. The network node according to claim 15, wherein the processing means comprises a processor and a memory, wherein the memory contains instructions executable by the processor.

17. A method, performed in a wireless device, for channel characteristics handling for an antenna array in a communication system, the antenna array having a plurality of antenna elements, the method comprising:

receiving a representation of the channel characteristics as P(β), β being a vector of elements, each element relating to a covariance between antenna elements of the antenna array and P being a mapping function based on a classifying of pairs of the antenna elements into sets, all pairs of antenna elements in a set having substantially equal geometrical relationship in a spatial layout of the antenna elements in the antenna array, a number of sets being equal to a number of unique geometrical relationships between the pairs of antenna elements, the mapping function being a matrix having a dimension equal to a total number of unique covariances and a dimension equal to a dimension of the vector β, each element of the matrix being precalculated based on at least one of the unique covariances; and processing channel characteristics related to the antenna array based on the mapping function P( ).

18. The method according to claim 17, wherein the processing further comprises performing a measurement on at least one signal and estimating elements of the vector β based on the performed measurement.

19. The method according to claim 17, wherein the processing comprises transmitting information relating to elements of the vector β.

20. The method according to claim 17, wherein the mapping function P( ) is a matrix defined by $$\text{vec}\{R_{mn}\} = P\beta$$

wherein covariance between antenna elements is represented by a covariance matrix $R_{mn}$, $\text{vec}\{R_{mn}\}$ denoting a vectorization of $R_{mn}$, m and n being indices running over the number of antenna elements of the antenna array.

21. A wireless device configured for channel characteristics handling for an antenna array in a communication system, the antenna array having a plurality of antenna elements, the wireless device comprising:

a receiving module configured to receive a representation of the channel characteristics as P(β), β being a vector of elements, each element relating to a covariance between antenna elements of the antenna array and P being a mapping function based on a classifying of pairs of the antenna elements into sets, all pairs of antenna elements in a set having substantially equal geometrical relationship in a spatial layout of the antenna elements in the antenna array, a number of sets being equal to a number of unique geometrical relationships between the pairs of antenna elements, the mapping function being a matrix having a dimension equal to a total number of unique covariances and a dimension equal to a dimension of the vector β, each element of the matrix being precalculated based on at least one of the unique covariances; and a processing module configured to process channel characteristics related to the antenna array based on the mapping function P( ).

22. The wireless device according to claim 21, wherein the processing module is further configured to perform a measurement on at least one signal and to estimate elements of the vector β based on the performed measurement.

23. The wireless device according to claim 21, wherein the processing module is configured to transmit information relating to elements of a vector β.

* * * * *